United States Patent [19]

Meadows

[11] Patent Number: 5,775,714
[45] Date of Patent: Jul. 7, 1998

[54] TOW BAR

[76] Inventor: Leon Meadows, 822 Bunny Rabbit Rd., Athens, Tex. 75751

[21] Appl. No.: 616,726

[22] Filed: Mar. 15, 1996

[51] Int. Cl.⁶ .................................................. B60D 1/16
[52] U.S. Cl. ................... 280/458; 280/491.1; 280/491.4
[58] Field of Search .................... 280/458, 491.1, 280/491.2, 491.3, 491.4

[56] References Cited

U.S. PATENT DOCUMENTS

| | | | |
|---|---|---|---|
| 1,429,734 | 9/1922 | Hoffman . | |
| 1,565,999 | 12/1925 | Halt . | |
| 1,758,951 | 5/1930 | Johnson | 280/458 |
| 2,378,297 | 6/1945 | Hetzler | 280/458 |
| 2,560,908 | 7/1951 | Thompson | 280/33.1 |
| 2,603,502 | 7/1952 | Hilblom | 280/33.5 |
| 2,646,290 | 7/1953 | Cox | 280/33.55 |
| 2,726,097 | 12/1955 | Darrough | 280/458 |
| 2,913,256 | 11/1959 | Sharpe | 280/444 |
| 3,510,146 | 5/1970 | Hartman | 280/491 |
| 3,801,138 | 4/1974 | Quick | 280/491.1 |
| 3,860,266 | 1/1975 | Frank et al. | 280/458 |
| 4,013,303 | 3/1977 | Milner | 280/491.4 |
| 4,127,202 | 11/1978 | Jennings et al. | 214/85 |
| 4,799,711 | 1/1989 | Moore | 280/491.2 |
| 5,000,473 | 3/1991 | Johnson | 280/491.4 |
| 5,441,294 | 8/1995 | Losier | 280/491.4 |

FOREIGN PATENT DOCUMENTS

| | | | |
|---|---|---|---|
| 1576357 | 7/1990 | U.S.S.R. | 280/491.1 |

*Primary Examiner*—Daniel G. DePumpo
*Attorney, Agent, or Firm*—Sidley & Austin

[57] ABSTRACT

A tow bar (10) is disclosed which has first and second arms (34, 40) mounted on a member (16) on the towing vehicle (12). The arms can vary in length between a shortened storage configuration, where they are secured to the first member, to a lengthened towing configuration where they are attached to a second member (70) attached to the towed vehicle (14). The arms are attached to the members for pivotal motion about vertical axes. The arms themselves have horizontal pivot hinges near each end thereof and a hinge permitting each arm to twist. The tow bar provides for efficient backing.

13 Claims, 2 Drawing Sheets

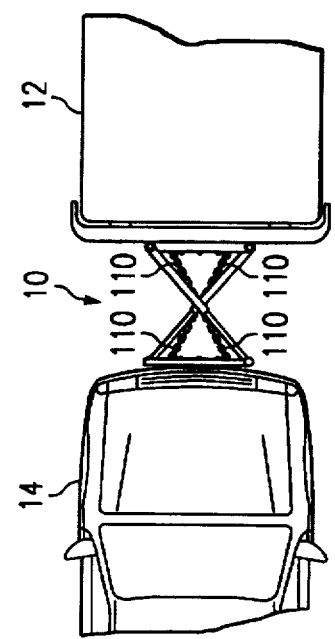
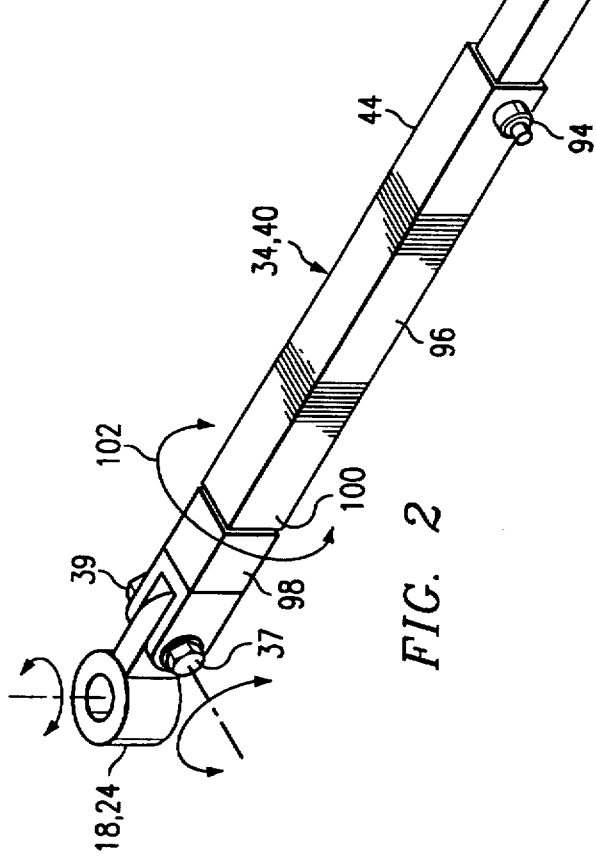
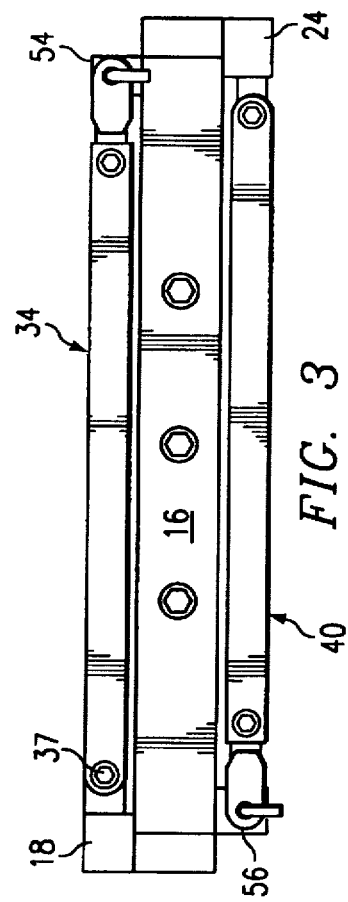

TOW BAR

TECHNICAL FIELD OF THE INVENTION

This invention relates to the towing of devices, specifically a device which allows reverse motion.

BACKGROUND OF THE INVENTION

The most common towing apparatus is the traditional ball and socket device where a ball is mounted on the towing vehicle and a socket is mounted on the towed vehicle. While this device is adequate in many situations, it is particularly difficult to back the vehicles.

A need therefore exists for an improved towing system which allows for backing, while providing an inexpensive, reliable and safe system. Ideally, the system should be easy to connect and easy to disconnect and provide a maximum of flexibility.

SUMMARY OF THE INVENTION

In accordance with one aspect of the present invention, a tow bar is provided for connection between a first device and a second device. The tow bar includes a first member attached to the first device and a first arm pivoted at a first end thereof to the first member for motion between a storage position and a towing position. A second arm is pivoted at a first end thereof to the first member for motion between a storage position and a towing position also. A second member is attached to the second device. The first and second arms are secured at the second ends thereof to the second device in the towing position. The first and second arms are parallel each other in the storage position with the second ends secured to the first member.

In accordance with another aspect of the present invention, the first ends of the arms are pivoted to the first member for movement about a generally vertical axis. The second ends of the arms are also pivotally mounted to the second device for motion about a generally vertical axis in the towing position. Each of the arms has a hinge proximate each of the ends thereof for pivotal motion about a generally horizontal axis. Each arm is also provided with a pivot dividing each arm into first and second elements pivotal relative each other to accommodate twisting motion.

BRIEF DESCRIPTION OF THE DRAWINGS

For a more complete understanding of the present invention and for further advantages thereof, reference is now made to the following description of the preferred embodiment taken in conjunction with the accompanying drawings in which:

FIG. 2 is a perspective view of one of the arms used in the tow bar;

FIG. 3 is a side view of the towing member forming part of the tow bar with the arms in the storage position; and FIG. 4 is a plan view of the tow bar connected between two vehicles for towing.

DETAILED DESCRIPTION

Figure 1:
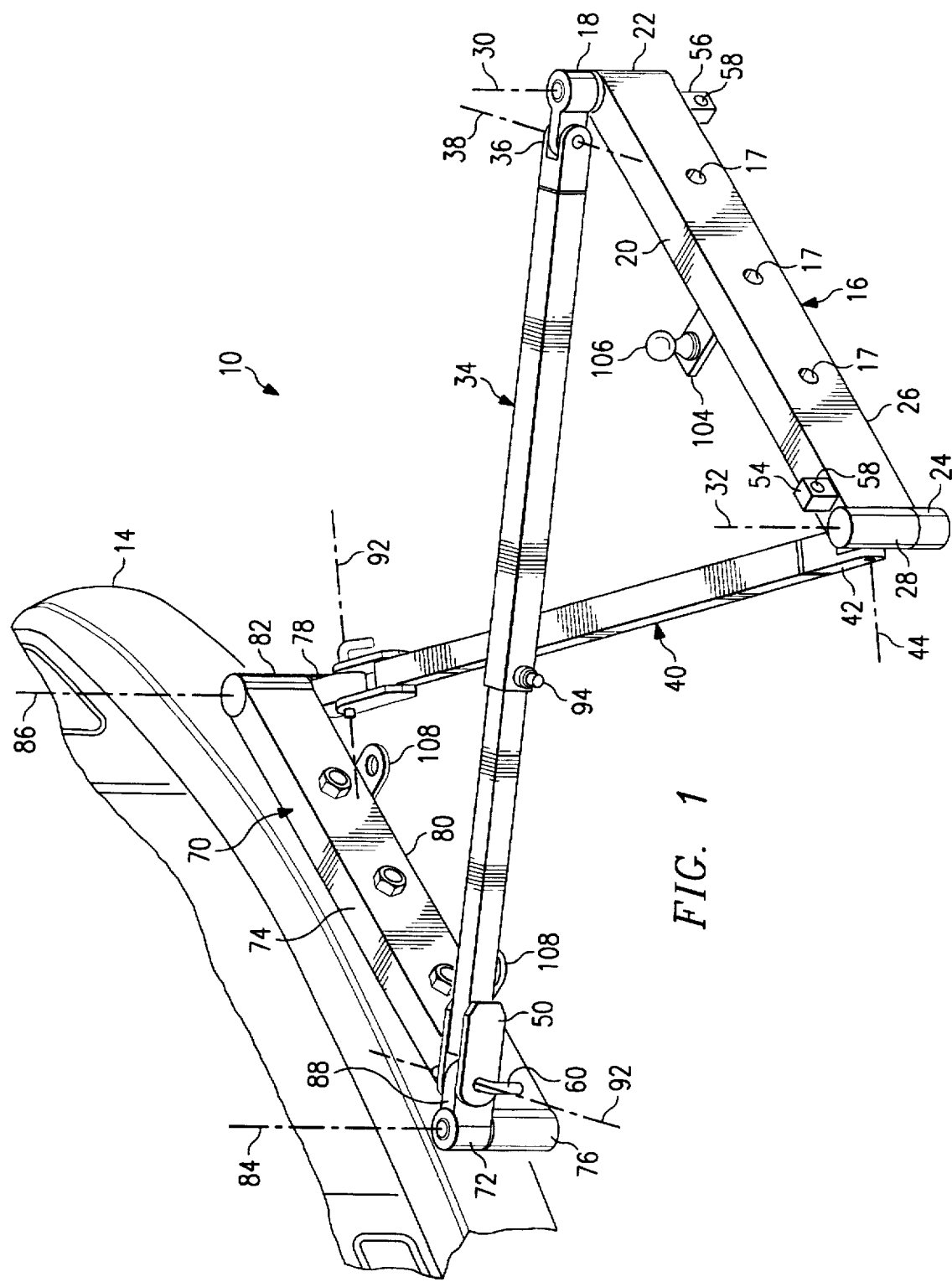
FIG. 1 is a perspective view of a tow bar forming a first embodiment of the present invention connecting first and second devices.

With reference now to the figures, a tow bar 10 will be described which forms a first embodiment of the present invention. While the tow bar 10 is illustrated as being connected between a towing vehicle 12 and a towed vehicle 14, the tow bar can be used between any two devices where forces need to be transferred between the devices in a manner within the capability of the tow bar 10.

With reference to FIG. 1, the tow bar 10 can be seen to include a towing member 16 which is rigidly attached to the towing vehicle 12. The member 16 can be bolted to the towing vehicle 12 through bolt apertures 17. Preferably, member 16 is attached to the frame of vehicle 12, but could be attached to a bumper, if desired. Member 16 could also be attached to vehicle 12 by other techniques, such as welding, or even be formed as part of the vehicle itself.

An upper pivot 18 is mounted to the member 16 on the top 20 thereof at end 22 of the member. A lower pivot 24 is mounted to the member on the bottom 26 thereof at the opposite end 28. The pivots are mounted to member 16 for pivotal motion about axes 30 and 32, respectively, which are generally vertical.

A first arm 34 is mounted to the upper pivot 18 through hinge 36 for motion about an axis 38 which is generally horizontal. Hinge 36 is formed about bolt 37 and nut 39 which secure arm 34 to upper pivot 18. A second arm 40 is similarly mounted to the lower pivot 24 by a hinge 42 formed by bolt 37 and nut 39 which pivots about axis 44 which is also generally horizontal. As best seen in FIG. 2, each arm 34 and 40 has an outer portion 44 and an inner portion 46 which can telescope within the outer portion 44 to vary the length of the arm. The exposed end 48 of the inner portion 46 of each arm mounts a clevis 50 which has opposed apertures 52. The inner portion can be retracted into the outer portion in the storage position, as seen in FIG. 3, with the first and second arms parallel each other and parallel the length of the member 16. The member 16 has a upper extension 54 on the top 20 at end 28 and a lower extension 56 extending from the bottom 26 at end 22. Each extension 54 and 56 has an aperture 58 which aligns with the apertures 52 when the arms are in the storage position so that a pin 60 can secure the clevis of each arm to an extension for storage when the tow bar is not in use. Pin 60, in turn, can be secured in this position with a cotter pin or spring clip (not shown), through hole 61 in pin 60. A bolt, or other suitable fastener, could be used in place of pin 60, if desired.

The towed vehicle 14 mounts a towed member 70 which is secured to the towed vehicle as by bolting as shown, welding or other attachment technique. The member 70 has an upper pivot 72 mounted on the top 74 thereof at end 76 and a lower pivot 78 at the bottom 80 thereof at the opposite end 82. The pivots 72 and 78 are mounted on the member 70 for pivotal motion about axes 84 and 86, respectively, which are preferably generally vertical. Each pivot 72 and 78 has an extension 88 which includes an aperture 90 (not shown).

When the arms are connected to the member 70 for towing, the clevis 50 of each of the arms is put over an extension 88 of pivot 72 or 78 to align aperture 90 with apertures 52. Pin 60 can then be used to secure the arms to the member 70. Pin 60, in turn, can be secured in place by a cotter pin or spring pin (not shown) through hole 61. A bolt, or other suitable fastener, could be used in place of pin 60, if desired. The pin 60 permits pivotal motion about axes 92 passing through the aligned apertures 52 and 90 which are generally horizontal.

In the towing position, when towing forces are first transferred through the tow bar, the inner portion 46 of each arm moves out from the outer portion 44 until a snap lock pin 94 snaps into place, preventing further motion of the inner portion 46 relative to the outer portion 44. As can be seen, the arms cross over each other in the towing configuration. Before the lock pin 94 is engaged, the length of the arms can be easily adjusted between the storage length and the towing length to facilitate securing the arms to member 70. All that is required is to move the towing vehicle a little closer to the towed vehicle than it would be while towing and the arms should then be easy to attach to member 70.

The outer portion 44 of each arm is divided into two sections, first section 96 and second section 98 connected by a hinge 100 which allows the sections 96 and 98 to twist relative to each other in the direction of arrow 102 about an axis generally parallel with the elongate axis of the outer portion 44. In other words, first section 96 and second section 98 can pivot relative each other along the elongate axis of the outer portion 44.

As can be seen from the description of tow bar 10, each of the arms is articulated for motion about generally vertical and horizontal axis at each end thereof and also for twisting at hinge 100. This provides a maximum flexibility of the tow bar to accommodate relative motion between the towing vehicle 12 and towed vehicle 14. As noted, the arms cross over each other, with first arm 34 above second arm 40 to provide a relatively rigid frame-like structure which provides for efficient transfer of forces between the vehicles. It has been shown that the towed vehicle follows much more directly in the tracks of the towing vehicle, particularly in tight turns, then is possible with a conventional ball and socket tow system. Further, the rigid connection permits the vehicles to move in reverse with the front wheels of the towed vehicle having no tendency to move to a position making backing difficult, as occurs in prior tow bar designs.

With reference to FIG. 1, the member 16 can be seen to be provided with a conventional tongue 104 mounting a tow ball 106 for use with conventional towing devices, if desired. Further, extensions 108 can be provided on each of the members to mounted safety chains 110 extending between the members to meet necessary safety requirements and provide a redundant attachment. As seen in FIG. 4, the chains 110 also cross over each other just as arms 34 and 40. This provides for less interference by the chains in normal use of the tow bar.

Preferably, a special tool can be provided to retract the snap lock pin 94 in each of the arms to allow the arms to be collapsed to the storage position again. The force of the tow will pull the inner portion 46 out of the outer portion 44 until the snap lock is actuated automatically when towing first begins.

In one embodiment constructed in accordance with the teachings of the present invention, the arms were separated by a vertical distance of about four inches. This was found to be an adequate separation to avoid contact between the arms during towing. Also, the outer portion 44 was made of one and one-half inch square tubing while the inner portion was made of one inch square tubing. The lock pin was a five-eighths inch diameter pin.

Although the present invention has been described with respect to a specific preferred embodiment thereof, various changes and modifications may be suggested to one skilled in the art. It is intended that the present invention encompass such changes and modifications as fall within the scope of the appended claims.

I claim:

1. A tow bar for connection between a first device and a second device for transferring forces, comprising:

a first member attached to the first device;

a first arm pivoted at a first end thereof to the first member for motion between a storage position and a towing position;

a second arm pivoted at a first end thereof to the first member for motion between a storage position and a towing position;

a second member attached to the second device;

the first and second arm secured at second ends thereof to the second device in the towing position with the second ends of said arms pivoted to the second member at positions spaced apart from each other with the first and second arms crossing each other in the towing position, the first and second arms parallel each other in the storage position with the second ends secured to the first member.

2. The tow bar of claim 1 wherein the first ends of the first and second arms are mounted to the first member for pivotal motion about a generally vertical axis.

3. The tow bar of claim 1 wherein the first and second arms are hingeably secured at their first ends to the first member for pivotal motion about a generally horizontal axis.

4. The tow bar of claim 1 wherein the second ends of said arms are pivoted to the second member in the towing position for motion about a generally vertical axis.

5. The tow bar of claim 1 wherein the first and second arms are hingeably secured at their second ends to said second member for pivotal motion about a generally horizontal axis.

6. The tow bar of claim 1 wherein each of the first and second arms has a first section and a second section, the first and second sections hingably secured together for relative pivotal motion about an axis generally extending along the length of the arms.

7. The tow bar of claim 1 further having safety chains, said safety chains mounted between the first and second members.

8. The tow bar of claim 1 wherein the first and second arms are spaced vertically apart.

9. A tow bar for connection between a first device and a second device for transferring forces, comprising:

a first member attached directly to the first device;

a first arm having a rigid portion and a telescoping portion, the telescoping portion telescoping within the rigid portion between a shortened configuration and a lengthened configuration, the first arm having a first end and a second end, the first end secured to the first member;

a first lock to hold the telescoping portion in the lengthened configuration;

the first arm having an elongate length, the first arm having a first arm section and a second arm section, the first and second arm sections pivotally connected together for relative pivotal motion about an axis generally parallel the elongate length;

a second arm having a rigid portion and a telescoping portion, the telescoping portion telescoping within the rigid portion between a shortened configuration and a lengthened configuration, the second arm having a first end and a second end, the first end secured to the first member;

a second lock to hold the telescoping portion of the second arm in the lengthened configuration;

the second arm having an elongate length, the second arm having a first arm section and a second arm section, the first and second arm sections pivotally connected together for relative pivotal motion about an axis generally parallel the length of the second arm;

a second member mounted directly on the second device, the second ends of the first and second arms being secured to the second member in a towing position; and the first and second arms crossing in an "x" configuration when in the towing position and the second device tracking in the path of the first device.

10. The tow bar of claim 9 wherein the first member has a top and a bottom, a first side and a second side, the first arm pivotally secured to the first member on the first side thereof at the top of the first member and the second arm pivotally secured to the first member on the second side at the bottom of the first member, each of said arms being mounted for pivotal motion about a generally vertical axis.

11. The tow arm of claim 10 wherein the second member has a top and a bottom, a first side and a second side, the first arm pivotally secured to the second member on the second side at the top of the second member in the towing position and the second arm being pivotally secured to the second member on the first side at the bottom of the second member for pivotal motion about a generally vertical axis.

12. A tow bar for connection between a first device and a second device for transferring forces, comprising:

a first member attached to the first device;

a first arm having a rigid portion and a telescoping portion, the telescoping portion telescoping within the rigid portion between a shortened configuration and a lengthened configuration, the first arm having a first end and a second end, the first end secured to the first member;

a first lock to hold the telescoping portion in the lengthened configuration;

the first arm having an elongate length, the first arm having a first arm section and a second arm section, the first and second arm sections pivotally connected together for relative pivotal motion about an axis generally parallel the elongate length;

a second arm having a rigid portion and a telescoping portion, the telescoping portion telescoping within the rigid portion between a shortened configuration and a lengthened configuration, the second arm having a first end and a second end, the first end secured to the first member;

a second lock to hold the telescoping portion of the second arm in the lengthened configuration;

the second arm having an elongate length, the second arm having a first arm section and a second arm section, the first and second arm sections pivotally connected together for relative pivotal motion about an axis generally parallel the length of the second arm;

a second member mounted on the second device, the second ends of the first and second arms being secured to the second member in a towing position;

the first and second arms crossing in an "x" configuration when in the towing position and the second device tracking in the path of the first device; and the first member having a top and a bottom, a first side and a second side, the first arm pivotally secured to the first member on the first side thereof at the top of the first member and the second arm pivotally secured to the first member on the second side at the bottom of the first member, each of said arms being mounted for pivotal motion about a generally vertical axis.

13. The tow arm of claim 12 wherein the second member has a top and a bottom, a first side and a second side, the first arm pivotally secured to the second member on the second side at the top of the second member in the towing position and the second arm being pivotally secured to the second member on the first side at the bottom of the second member for pivotal motion about a generally vertical axis.

* * * * *